FIG. 1

JOHN E. MAGEE
INVENTOR

United States Patent Office 3,314,501
Patented Apr. 18, 1967

3,314,501
SEGREGATED DEMAND CONTROL FOR
ELEVATOR SYSTEMS
John E. Magee, Greenburgh, N.Y.
(191 Forest Blvd., Ardsley, N.Y. 10502)
Filed July 13, 1962, Ser. No. 209,564
20 Claims. (Cl. 187—29)

The invention relates to dispatching and control systems for two or more elevators.

It is current practice in the dispatching art to separate departures of cars from a dispatching terminal on a regular timed basis. It is also current practice to separate departures of such cars based on the demand ahead of each such car when selected at the dispatch terminal. It is known in the art in determining dispatch demand for a selected car to ignore a preceding car based on its fully loaded status or to partially discount it based on the severity of the group demand ahead of it. It is also known in the art to restrict service by certain cars of a group to group demands for travel in a single direction. In the invention disclosed herein, a dispatch period is both initiated in advance of selection of a car at the dispatch terminal and controlled in duration by the type of demand to which that car may be anticipated to respond. In the determination of demand requisite to dispatch of a car, the system of the invention ignores a preceding departed car which has a certain number of registered stop demands specific to that departed car. In response to a certain number of group demands for service in one direction the invention also automatically causes one pre-assigned car to service such demands to the exclusion of group demands for travel in the opposite direction and conversely restricts service of remaining cars of the group to group demands only for travel in such opposite direction.

It is, therefore, a object of the invention to provide a dispatching and control system for two or more elevator cars in which response of each car is controlled by the nature, or class, of registered demand to which it is subject.

In the preferred embodiment of this invention, when no car is available at the dispatch landing and a landing call is registered at the dispatch landing or between it and the nearest departed car, a dispatch period is initiated. In the case of the landing call at the dispatch floor arrival of a car results in cancellation of such landing call. However, the dispatch landing call is remembered sufficiently long after cancellation to permit the intending passenger to enter and register a car call which thus sustains continuity of the timing of the dispatch period. If a car is selected at the dispatch terminal upon registration of the initial landing call behind the preceding departed car, inception of the dispatch period will occur at that time. Registration of a car call in the selected car can similarly initiate the dispatch period.

The duration of the dispatch period is arranged to be longest for a car call alone which represents a single future stop, for delivery of that passenger. A landing call behind the preceding car indicates two future stops, to pick up and deliver and is recognized by a somewhat shorter dispatch period. For both types, or classes, of demand together, a minimum of three future stops may generally be expected, and hence the period is further reduced for the combination. Each of these three period variations is also proportionately reduced if more than one car is available at the dispatch terminal.

Whenever a next preceding car has more than a certain number of future stop commitments as evidenced by the number of car calls registered in it, its effectiveness for servicing landing calls ahead of it is reduced. In recognition of this condition, such a car in the preferred embodiment is excluded in consideration of all behind status for dispatch of the next car. Dispatch of such next car may thus be expedited to help serve group demands ahead of a car with a multiplicity of specific stop demands.

In the invention, it is also recognized that more than a certain amount of one type of demand frequently exerts an undesirable effect on service to another type of demand and that this can be alleviated by segregation of a car or cars for one type of demand while conversely restricting service of other cars in the group. In the preferred embodiment, more than a certain volume of registered up landing call demands automatically causes one car to respond to those demands to the exclusion of lobby and down landing demands and causes all other cars of the group to respond to such lobby and down landing demands to the exclusion of such landing demands. Exclusive service of one car for up landing demands results, without commitment of that car to return to the dispatch landing. All other cars freed of stops for up landings calls then expedite delivery of passengers ascending from the lobby dispatch terminal.

Features and advantages of the invention will be seen from the foregoing and from the following description of the operation of the preferred embodiment, which description should be considered in conjunction with the accompanying drawings in which:

The invention will be described as a control and dispatching system for a three car group of elevators, serving landings 1 and 12 through 19, with landing 1 the principal dispatch landing. It is assumed that the cars run express past landings 2 through 11 to clarify the operation in one area of the invention. It is to be understood, however, that principles of the invention are equally applicable to elevator installations having a different number of landings and/or a different number of cars and those without an express zone of landings.

The circuits for some intermediate landings served have been omitted for simplification, it being understood circuits for those landings are similar to those shown for other intermediate landings.

To further simplify the disclosure control and power circuits for operation of car and landing doors have been omitted it being understood they are of a type commonly known in the elevator art for automatic operation of doors. Contacts DCO and GI (FIG. 2) represent their closed status.

For simplicity also many of the circuits are shown for one car only, it being understood that counterpart circuits for the remaining two cars are similar. For circuits shown for all cars a differentiation is made by appending lower case letters "a," "b" and "c" to indicate the different elevator cars.

The electromagnetic switches employed in the disclosed system are designated:

| | |
|---|---|
| 1C, 12C, etc. | Car Call Switches. |
| CK | Car Call Demand Switch. |
| CKQ | Car Call Quota Switch. |
| 12DH–TDH | Down Landing Call Switches. |
| DN | Down Direction Switch. |
| H | Field and Brake Switch. |
| HCC | Car Call Above Switch. |
| HJD | Down Landing Call Above Switch. |
| HJU | Up Landing Call Above Switch. |
| LI | Long Interval Switch. |
| NT | Dwell Time Switch. |
| 12PID–TPID | Down Position Switches. |
| PDZ | Position Zone Switch. |
| IPIU and 12PIU–18PIU | Up Position Switches. |
| SGR | Segregation Switch. |
| SI | Short Interval Switch. |
| SR | Start Switch. |
| SS | Stopping Switch. |
| T | Terminal Time Switch. |
| UDB | Demand Behind Switch. |
| IUH and 12UH–18UH | Up Landing Switches. |
| IUHT | Lobby Call Memory Switch. |
| UP | Up Direction Switch. |
| VB | Availability Switch. |
| WB | Selection Switch. |
| WBX | Dispatch Switch. |
| XC | Car Call Stop Switch. |
| XH | Reversal Switch. |
| XS | Landing Call Stop Switch. |
| XSGR | Auxiliary Segregation Transfer Switch. |
| YSGR | Segregation Transfer Switch. |

In the wiring diagrams the foregoing identifying letters are applied to the coils of the electromagnetic switches and, with reference numerals appended thereto, are applied to the different sets of switch contacts actuated by energization of the associated coils, all contacts being shown for the de-energized status of such coils. Numerical prefixes for certain families of switches such as PIU, PID, UH, DH and C indicate the landing with which each is associated. Switches SR, UP and DN are of the latching type each with a set coil and a reset coil actuated by momentary energization. Their contacts are shown for the reset condition of those switches.

Manually operated switches are designated ES$a$, KS1$a$, KS1$b$ and KS1$c$ the first indicating the emergency stop devices and the KS family affording means for manual assignment of cars for response in accordance with a certain operation of the invention.

Contacts ML, TL and TLX are mechanically actuated by location of the associated car at or adjacent to the 1st, 19th and 12th landings, respectively. Those of ML are indicated for the condition in which car "$a$" is assumed at the main or 1st landing. Those of TL and TLX are indicated for the condition in which no car is situated at the top or 12th landings.

Figure 1:
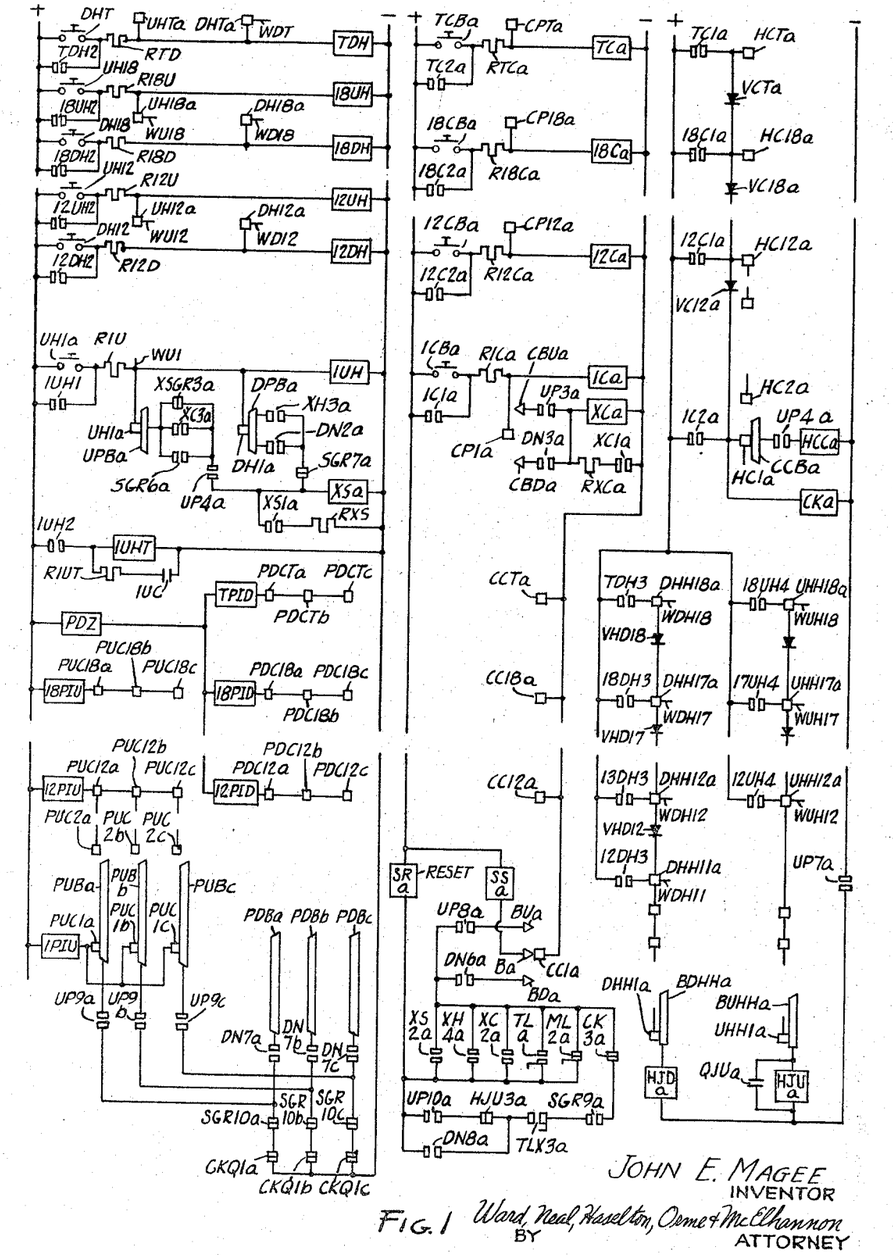
FIG. 1 is a simplified schematic wiring diagram of certain of the elevator control circuits for a three car group including principally circuits dependent on car positions as reflected by coordinated action of the selector mechanisms.
Figure 2:
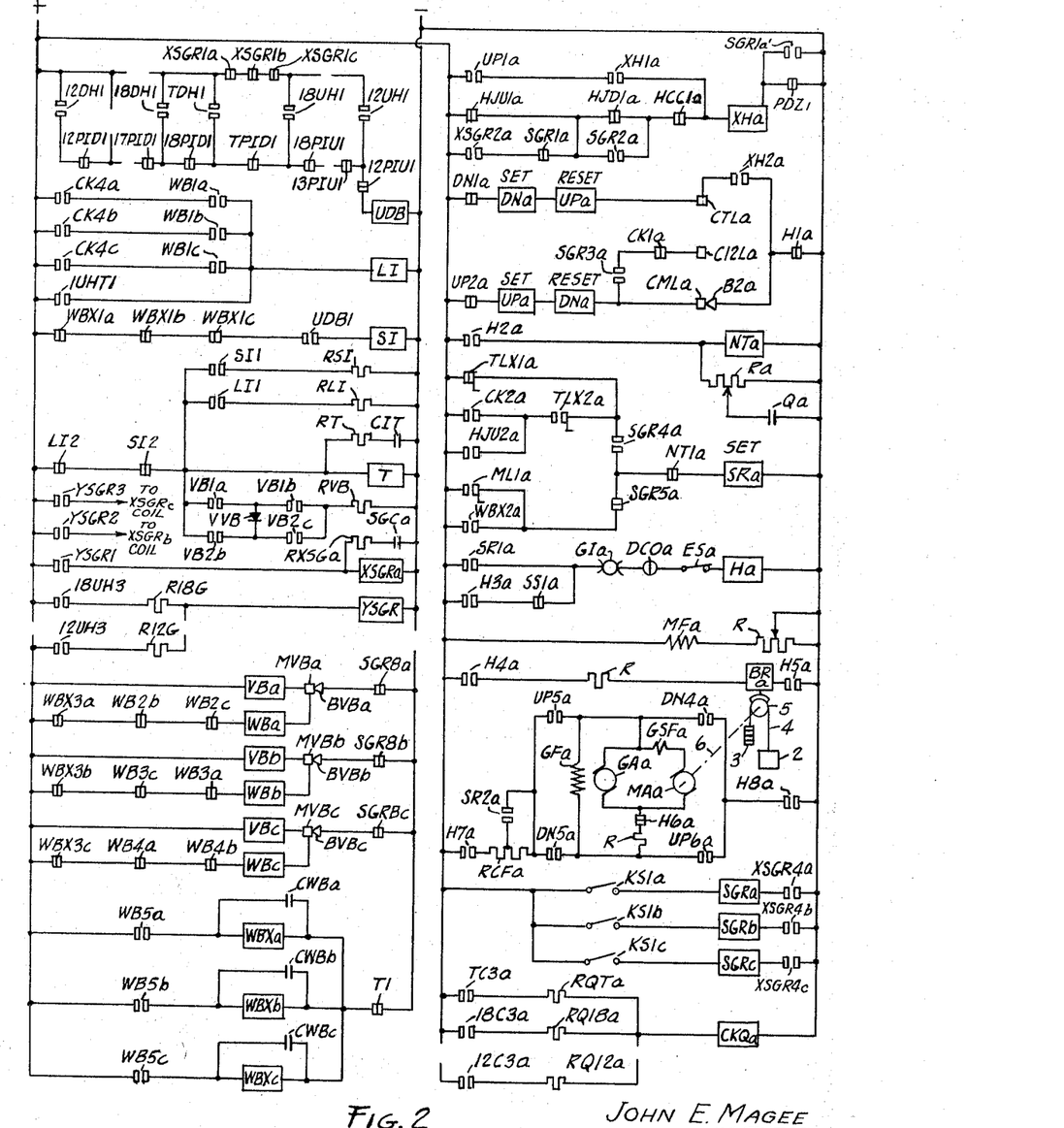
FIG. 2 is a simplified schematic wiring diagram of remaining elevator control and power circuits and dispatch control circuits.
Figure 3S:
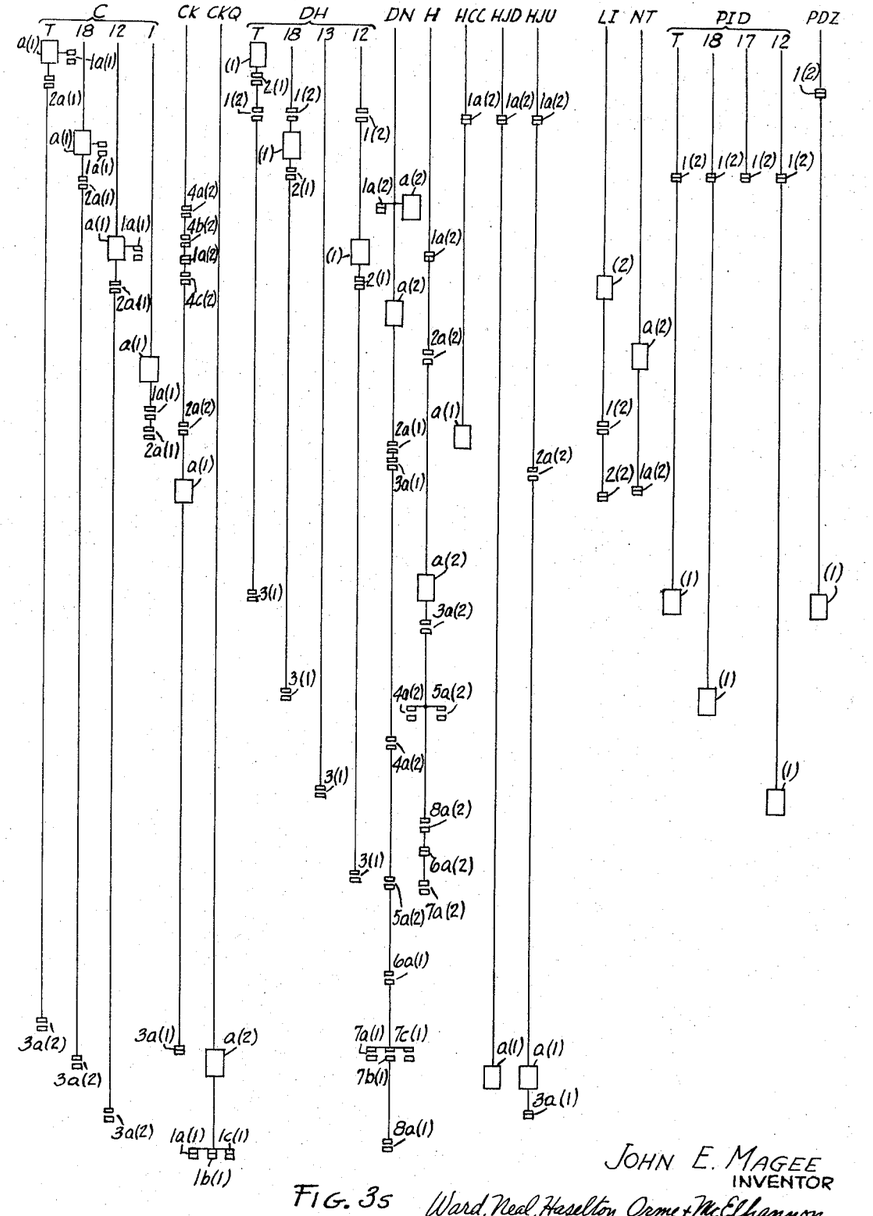
FIGS. 3S and 4S are conventional spindle sheets for use in contiguous relationship with FIGS. 1 and 2 to facilitate the finding of specific coils and contacts thereon, the number of the figure in which a particular contact or coil appears being appended to its spindle sheet designation.
Figure 4S:
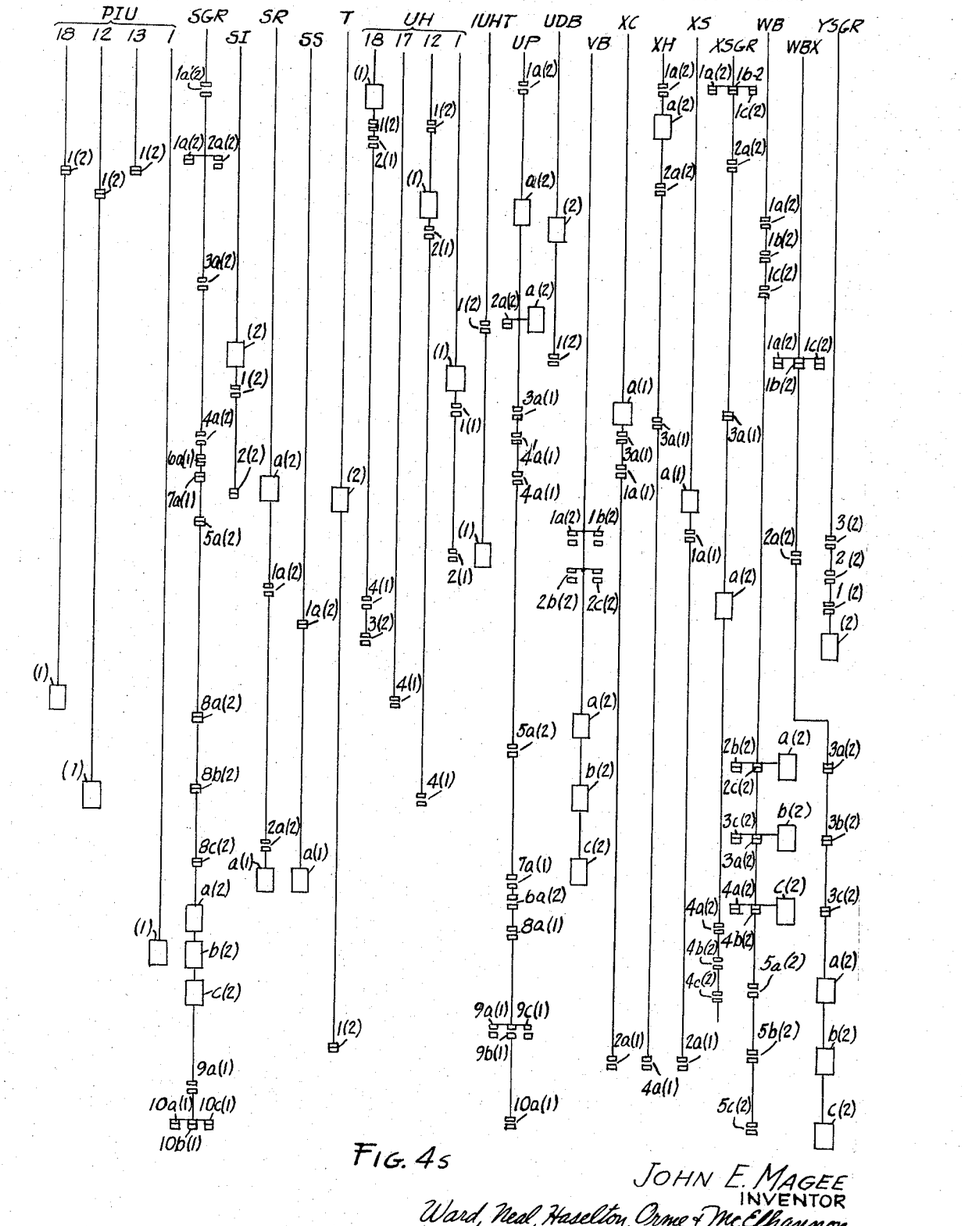
Figure 5:
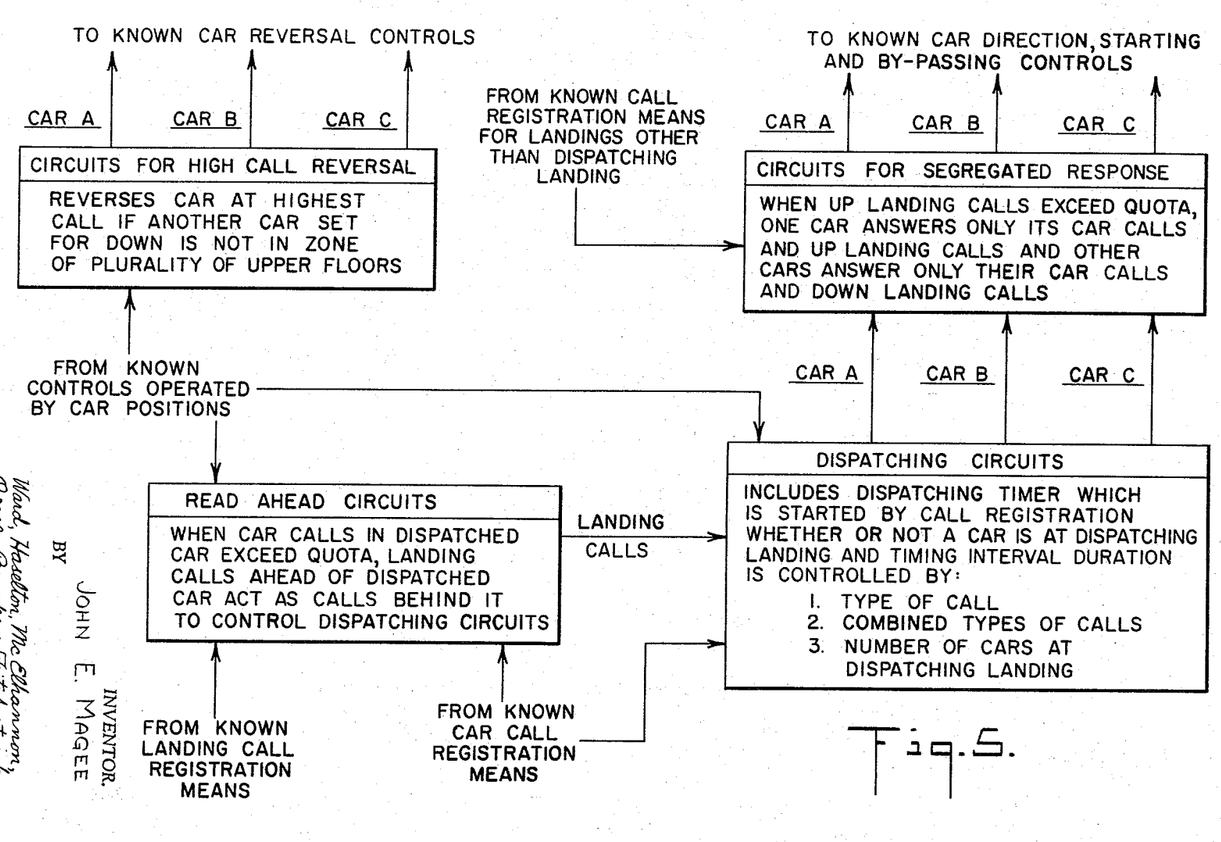
FIG. 5 is a block diagram setting forth the principal feature of the invention.

FIGS. 1 and 2 indicate certain brushes and contacts are utilized in the control circuits of each elevator which are actuated in accordance with movement of the car from floor to floor. These may be actuated by any conventional selector mechanism familiar to those skilled in the art and reflect car position at all times relative to landings served. For simplicity a brush carrying panel which moves in synchronism with the car is assumed but it will be understood that selector advancer panel mechanisms or hatchway switching may be readily employed in a similar manner.

In the wiring diagrams the following selector brushes and cooperating stationary contacts associated with floors served are utilized:

| Brushes: | Contacts |
|---|---|
| B | CC1 and CC12–CCT. |
| BVB | MVB. |
| B2 | CML, C12L and CTL. |
| UPB | UH1 and UH12–UHT. |
| DPB | DH1 and DH12–DHT. |
| CBU–CBD | CP1 and CP12–CPT. |
| BU–BD | CC1 and CC12–CCT. |
| CCB | HC1–HCT. |
| PUB | PUC1–PUC18. |
| PDB | PDC12–PDCT. |
| BUHH | UHH1–UHH18. |
| BDHH | DHH1–DHHT8. |

It will be understood that the first three brushes listed are oriented in phase with car position relative to landings, the last four listed are arranged to bridge adjacent associated contacts and the remaining brushes listed are oriented for advance action with respect to car position in approaching a landing. The last four listed also utilize added contacts for landings of the express zone to provide circuit continuity.

In FIG. 2, car $a$, having a cab 2, shown connected to counterweight 3, is raised or lowered by means of hoisting roping 4 passing over traction sheave 5 fixed to shaft 6 of the hoisting machine. The hoisting machine consists of a direct current hoisting motor having an armature MA$a$ supplied with current at a variable voltage from a generator armature GA$a$ which is rotated by a driving motor (not shown). The hoisting motor has a separately excited field winding designated MF$a$. The generator has a series field winding designated GSF$a$ and a separately excited field winding GF$a$. Starting and slowdown switch SR$a$, through contacts SR2$a$, controls the strength of the generator separately excited field winding GF$a$ by means of resistor RCF$a$ provided in the generator separately excited field circuit to effect deceleration of the car. BR$a$ designates the release coil of the electromagnetic brake of the hoisting machine. Similar components for cars $b$ and $c$ actuate those cars subject to dispatch and control of the invention.

The operation of starting an elevator car and stopping it for demands registered in the car and, selectively as to direction, for registered group demands at landings is well known to those skilled in the art. A study of circuits of the drawings based on switch designations readily discloses these operations. To facilitate a complete understanding, however, these operations will be described for car $a$, assuming it is dispatched from the lower terminal and responds to an up landing call at the twelfth landing, 12UH actuated, to a car call at the eighteenth landing, 18C$a$ actuated, and to a down landing call at the twelfth landing, 12DH actuated. For the assumed call conditions contacts 18C1$a$ cause actuation of switches CK$a$ and HCC$a$, contacts 12UH4 cause actuation of switch HJU$a$ and contacts 12DH3 cause actuation of switch HJD$a$.

For the assumed lower terminal location UP$a$ switch is operated and for the assumed dispatched status, switch WBX$a$ is operated. Contacts WBX2$a$ engaging complete a circuit to set switch SR$a$, in FIG. 2, through closed contacts SGR5$a$ and contacts NT1$a$, switch SR latching in its set condition. Its contacts SR2$a$ close to shunt a portion of the generator field resistance RCF$a$ for acceleration. Its contacts SR1$a$ closing complete a circuit to operate field and brake switch H$a$ through closed car door switch contacts GI$a$, hoistway door contacts DC0$a$ and emergency stop switch ES$a$.

Upon operation of switch H$a$ its contacts H7$a$ and H8$a$ close to complete a circuit, through closed contacts UP5$a$ and UP6$a$, for the separately excited generator shunt field GF$a$ subject to the unshunted portion of resistance RCF$a$. At this same time contacts H4$a$ and H5$a$ close to energize the electromagnetic brake coil BR releasing the machine brake. With the brake lifted and the generator field excited to cause generator GAa to furnish power to hoisting motor MAa the elevator accelerates and runs to its first stop demand. Contacts H2a closing cause actuation of dwell time switch NTa and contacts H3a prepare a sustaining circuit for switch Ha. As the car leaves the landing, brush Ba, FIG. 1, leaves contact CC1a to release switch SSa. Contacts SS1a then close to complete the Ha switch sustaining circuit. Car departure also permits contacts ML1a to close and ML2a to open.

As car a in its ascent leaves the eleventh floor, brush BDHHa leaves contact DHH11a and switch HJDa is released since a blocking rectifier prevents energization of higher DHHa contacts through the closed 12DH3 contacts.

As car a in its ascent approaches the twelfth landing, brush UPBa engages contact UH12a, FIG. 1, and switch XSa is actuated through contacts 12UH2, sustained since registration of the associated call by means of button UH12 to actuate switch 12UH; through resistor R12U and contacts XSGR3a and UP4a, closed at this time. At this time also, brush BUa is in engagement with CC12a to permit closing of contacts XS2a to complete a circuit for reset of SRa, through closed UP8a contacts. Contacts XS1a closing connect resistor RXS in shunt with switch 12UH to lower the voltage across that switch sufficiently to release it. Contacts 12UH2 thus opening, release switch XSa and contacts 12UH4 opening release HJUa switch. Stopping for the registered demand has thus been initiated and the demand erased. It is understood that the wire designated WU12 associated with UH12a connects to counterpart selector contacts UH12b and UH12c (not shown) to afford a similar stop initiation facility for these cars in response to the registered group demand. WU and WD wires associated with other landings serve a similar purpose.

Contacts SR2a, in FIG. 2, opening cause an increase in the active portion of resistance RCFa to lower excitation of field GF and result in deceleration of the elevator. Contacts SR1a opening cause switch Ha to become solely dependent on its sustaining circuit through H3a and SS1a contacts.

Upon arrival of car a at the twelfth landing level, switch SSa is operated as brush Ba engages contact CC12a. Contacts SS1a open to release switch Ha, contacts H4a and H5a of which open to release the brake and contacts H7a and H8a of which in opening disconnect separate excitation of the generator field GFa to stop the elevator at landing level.

Contacts H2a opening disconnect switch coil NTa but capacitor Qa sustains the switch a certain period to determine unloading or loading dwell at intermediate landing stops. Upon eventual release of NTa its contacts NT1a close to complete a circuit to set SRa. Since contacts ML1a closed on leaving the lower terminal and contacts WBX2a were opened then (to be explained later) contacts NT1a now complete the circuit to set SR through contacts SGR5a and ML1a. With car and hoistway door contacts GIa and DC0a closed, SR1a contacts closing complete the circuit for Ha actuation and upward acceleration occurs in a manner similar to that previously described.

As car a approaches the eighteenth landing brush CBUa engages contact CP18a, FIG. 1, to cause actuation of switch XCa. Contacts XC2a closing cause reset of SR and contacts XC1a closing result in call cancellation followed by deceleration and stopping in a manner similar to that described for approach to the twelfth landing. In conjunction with call cancellation contacts 18C1a separate to release switches CKa and HCCa.

Contacts HCC1a thus close, FIG. 2, to complete a circuit for actuation of switch XHa through contacts PDZ1, assumed closed, and HJU1a and HJD1a, both closed since upward departure from the twelfth landing.

Contacts XH2a close to prepare a circuit, completed upon final stop through contacts H1a, for reset of UPa switch and setting of DNa switch.

This action followed by later release of NTa results in succeeding motion of the elevator away from the eighteenth landing being in a downward direction since contacts DN4a and DN5a cause field GFa to be excited with polarity reversed from that for upward travel. Reversal of car travel at its landing of highest call is thus effected. It is evident that if such highest call had been an up landing call or a down landing call a similar reversal would be brought about after contacts HJU1a or HJD1a, respectively, permitted actuation of switch XHa. In the latter alternate, a down landing call as the uppermost demand, XHa would be activated on leaving the seventeeth landing and XH4a contacts closing would prepare for stop initiation, which occurs upon brush BUa engaging contact CC18a to reset SRa.

In its descent from the landing of highest call as car a approaches the twelfth landing, brush DPBa engages contact DH12a to complete a circuit through closed 12DH2 contacts, resistor R12D, closed contacts DN2a and SGR7a for actuation of switch XSa. Switch XSa as outlined for stopping in the up direction initiates slowdown. Its contacts XS1a closing now establish a shunt around the coil of switch DH12 to cause its release for call cancellation. Stopping and departure from the twelfth landing follow a sequence similar to that described for the up landing call there, it being understood that DNa switch actions supplant those of UPa.

Upon approaching the lower terminal car a actuates mechanical switch contacts ML1a and ML2a, the former to their open condition and the latter to their closed relationship. The ML2a contacts complete a circuit for SRa reset, through contacts DN6a brush BDa and contact CC1a, to initiate slowdown and stopping. Contacts ML1a opening in the SRa set circuit transfer starting control to parallel WBX2a contacts, actuated later, in conjunction with dispatch control at the lower terminal. As the car stops at the lower landing contacts H1a close to complete a circuit through brush B2a and contact CMLa to activate switch UPa and deactivate switch DNa in preparation for upward travel, when dispatched.

For an understanding of operation of the invention in controlling dispatch from the lower terminal of the preferred embodiment assume that prior to arrival of car a at that terminal a lobby up landing call is registered there with no other car available at that floor. Switch 1UH is activated to be sustained through its 1UH1 contacts. Contacts 1UH2 permit actuation of switch 1UHT. Contacts 1UHT1 in turn close to complete a circuit for actuation of switch LI. Contacts LI2 open to separate the T coil circuit from the power source. Charged condenser CIT in parallel with coil T, however, sustains that switch in its operated condition for a period of time related to the capacitance of CIT and impedances of its discharge circuits. One such circuit, in addition to the coil of switch T, can be seen to be completed through resistor RLI by contacts LI1, now closed.

Assume that prior to decay of the charge of condenser C sufficiently to release switch T, car a arrives at the lower terminal. In doing so it results in cancellation of 1UH in a manner similar to that described for 12DH. Contacts 1UH2 opening disconnect 1UHT from the power source but condenser 1UC sustains that switch a sufficient time to permit the waiting passenger to enter and register a car call.

On arrival of car a at the lower terminal its VBa switch is activated through contacts SGR8a, brush BVBa and contact MVBa. In the absence of any car selected these selection switch WBa is also activated. A car call, such as 12Ca, registered by an entering passenger results in actuation of switch CKa, such as through 12C1a contacts. Contacts WB1a and CK4a can be seen to cooperate to restore the circuit for the coil of LIa after contacts 1UHT1 have opened.

Upon ultimate release of switch T, say thirty seconds after inception of the lobby demand, contacts T1 close to complete a circuit through contacts WB5a for the coil of switch WBXa. Contacts WBX2a closing, contingent on prior closing of contacts NT1a, complete a circuit for starting car a upward away from the lower terminal, as previously described. Contacts WBX3a open to cause release of switch WBa. Contacts WB1a opening permit release of switch LI follower by re-energization, through contacts LI2, of switch T and its shunt capacitor CIT. Contacts WB3a and WB4a closing prepare for selection of a next car. With contacts WB5a and T1 now both open coil WBXa is isolated from the power source. Capacitor CWBa however sustains switch WBXa operated a sufficient time for doors to close and complete a circuit through lock contacts GIa and DCOa for actuation of HA and consequent departure upward of car a.

It is readily seen that if car a arrived at the lower terminal and was selected in the absence of a lobby demand a later registered car call in car a would initiate the assumed thirty second timed period. Contacts 1UHT1 would then be inactive, and contacts CK4a, through contacts WB1a, would initiate the LI, and thus T, action rather than merely sustaining the operation.

Assume now that with car a descending toward the lower terminal an up landing call is registered at the twelfth landing with car b ascending at the eighteenth landing and car c set downward trace, at the top landing. In FIG. 1, lower left, it will be seen that switch 18PIU will be activated reflecting status of car b and position switch TPID and position zone switch PDZ will be activated as a result of disposition of car c. The circuit for car b can be seen to include closed contacts CKQ1b, SGR10b and UP9b, brush PUBb contact PUC18b and the 18 PIU coil. A similar circuit for car c through brush PDBc and contact PDCTc permit actuation of TPID and PDZ. The registered up call at the twelfth landing is reflected by operated status of switch 12UH, self held through its 12UH2 contacts.

In FIG. 2, upper left, switch UDB may be seen to be controlled by registered landing calls and by position switch contacts. With contacts 18 PIU and TPID open, contacts 12UH1 closing permit actuation of switch UDB, the coil circuit extending through closed contacts 12PIU1, 12UH1, XSGR1c, XSGR1b and XSGR1a. Contacts UDB1 closing then cause actuation of switch SI, the coil energizing circuit including closed WBX1 contacts for all cars, since no car is dispatched at this time. Contacts SI2, isolate the T coil circuit from the power source and contacts SI1 connect resistor RSI for control of decay time of condenser CIT and thus release of switch T. This may be assumed to be in the nature of twenty seconds, which is less than the period dictated by LI action. This is on the premise that the up landing call indicates pickup and delivery stops whereas a car call needs only delivery. An explained for LI control of T ultimate release of that switch, through its T1 contacts, causes actuation of WBXa switch presuming prior lobby arrival of car a and the selected car a is dispatched upward. Contacts WBX1a separate to release switch SI, the SI2 contacts of which close to re-establish connection of the T circuit to the power feeders, positive and negative.

If it is assumed both types of demand previously described existed concurrently it can be seen that the LI and SI switches would both be actuated. This would provide both RLI and RSI resistors as elements for dissipation of the charge on capacitor CIT to effect a further shortening of the period it would sustain switch T, to a value, say, of ten seconds. Such a decrease is justified by the probability that three future car stops are represented, one for delivery of a car passenger and two for pickup and delivery of the intending passenger at the point of landing call behind other cars.

If preceding assumptions are modified to now assume more than a single car available at the lower terminal, say car a and car c, each of the indicated periods would be reduced. Switch VBa and switch VBc would be actuated. Contacts VB1a and VB2c would complete a circuit through rectifier VVB and resistor RVB to expedite discharge of condenser CIT and thus accelerate release of switch T with consequent advanced dispatch of whichever car was then selected.

Consider now a situation in which car b is selected at the lower terminal, car c is at the twelfth descending and car a is at the twelfth landing ascending. Assume further that a down landing call is registered at the eighteenth landing and that car a has a stop commitment for a certain number of registered car calls, say five. Nominally contacts 18DH1 would not be expected to effect operation of switch UDB for this condition because of open contacts 12PIU associated with the up travelling disposition of car a at the twelfth landing. However, each registered car call can be seen in FIG. 2 to complete a circuit, such as through contacts 18C3a and RQ18a resistor, to furnish current for the coil of switch CKQa. It is assumed the five such circuits, resultant from the assumed five registered car calls in car a, permit actuation of switch CKQa. Contacts CKQ1a separate to void action of switch 12PIU when car a is disposed there. Contacts 12PIU1 are thus closed in the UDB circuit to permit closed 18DH1 contacts to complete a circuit for coil UDB. Actuation of UDB permits its UDB1 contacts to close and initiate a release period for T, through SI action as formerly described for a twelfth up landing call. Sustained action of CKQa to a reduced number of car calls, such as two, can thus permit dispatch of the selected lobby car in response to a landing call which is ahead of a preceding car, car a in this case. The predictable slow trip of car a in this case justifies release of the lobby car as a helping car for expedited response to the landing call demand ahead of car a.

With respect to termination of upward travel under conditions other than those assumed previously in describing reversal of car a position zone switch PDZ will be seen to exercise control when operated in conjunction with any PID switch. While any car is at the top landing or available to serve down landing calls in the zone represented by 12PID through 18PID switch PDZ is operated. Its contacts PDZ1 then interrupt the XHa coil circuit for car a to prevent reversal of that car below the top landing. Absence of any down serving advance car in the aforesaid zone, however, permits closed PDZ1 contacts to prepare for lower reversal of car a. Similar PDZ contacts (not shown) will be understood to exercise a similar control of car b and car c. In effect then a spacing separation is provided between cars with respect to initiation of downward travel. Although the entire down service zone is included herein it is understood PDZ can be made subject to other floors if desired.

Assume now that manually operable switch KS1a is closed. This prepares for segregated response of the cars with respect to direction of registered group demands, car a exclusively to up landing demands and car calls and remaining cars of the group exclusively to down landing demands and car calls. Release of cars other than a single car from an obligation to stop for up landing calls will expedite delivery of passengers from the lower terminal to points of their registered car calls during upward travel. When a certain quota of up landing calls are registered, say five, their associated UH3 contacts closing furnish five current paths through R–G resistors to actuate switch YSGR, which in turn through its YSGR1 contact permits actuation of switch XSGRa. Contacts YSGR2 and YSGR3 complete circuits for counterpart XSGRb and XSGRc switch coils, respectively (not shown). Contact XSGR4a can be seen to complete a circuit for switch SGRa through the closed RS1a switch. Contacts XSGR4b and XSGR4c would similarly control SGRb and SGRc, respectively.

In the circuit for control of switch XSa contacts XSGR3a are now separated but contacts SGR6a are closed to retain preparation of that circuit for energization at landings of registered up landing calls. In the associated circuit to the DPB*a* brush, contacts SGR7*a* are separated to prevent stopping of car *a* in response to registered down landing calls.

In equivalent circuits for cars *b* and *c*, not shown, contact SGR6*b* and SGR6*c* remain open and contacts XSGR3*b* and XSGR3*c*, now open, prevent response of cars *b* and *c* to registered up landing calls. Since contacts SGR7*b* and SGR7*c* are not separated, switches RS1*b* and RS1*c*, respectively, being open, the facility of cars *b* and *c* to respond to registered down landing calls is not affected.

If car *b* or *c* stops to discharge a car passenger at a landing at which an up landing call is registered, closing of contacts XC3*b* or XC3*c* in conjunction with such stop may be seen to effect cancellation of a registered up landing call at that point. This is based on the assumption that an intending up passenger would enter and be served by such stopped car although the stop would be dictated by the assumed car call.

When car *a* is thus arranged to serve primarily up landing calls its starting control, SR*a* set in FIG. 2, is transferred by opening of contacts SGR5*a* and closing of contacts SGR4*a*. In the resultant control circuit mechanical contacts TLX1*a* are actuated to their open position only when car *a* is at or approaching the twelfth landing. This then normally prepares for starting of car *a* from all landings except the twelfth, dependent on release of switch NT*a* to close its contacts NT1*a*. Similarly when car *a* is at the twelfth landing contacts TLX2*a* are closed to prepare an alternate circuit in shunting relation to open TLX1*a* contacts. This shunt circuit is completed by contacts CR2 closing when any car call is registered in car *a*, or by contacts HJU2*a* closing if an up landing call is registered above car *a*. The nominal dispatch point of car *a* is thus transferred from the main landing to the twelfth and dispatch from that landing is dependent on a registered demand specific to that segregated car. It is obvious any other landing would be used for the dispatch point in the event up landing call service from lower floors was to be provided.

Contacts SGR3*a*, now closed, prepare for establishment of up direction of car *a* whenever it has no registered car call commitment, contacts CK1*a* closed, and car *a* arrives at the twelfth landing, as evidenced by brush B2*a* engaging contact C12L*a*.

Closed contacts SGR2*a* void effect of down landing calls in control of termination of upward travel of car *a*. Closed contacts (not shown) XSGR2*b* and XSRG2*c* exercise a similar function with respect to effect of up landing calls on reversal to down direction of cars *b* and *c*, respectively. Although contacts XSGR2*a* are also closed, open contacts SGR1*a* insure dependence of car *a* on absence of higher registered up landing calls as reflected in status of HJU1*a* contacts. Closed contacts SGR1*a*' insure independence of PDZ action in control of reversal point at car *a*. While segregated, termination of upward travel of car *a* thus is not dependent on separation from down serving cars *b* and *c*.

Open contacts SGR8*a* remove car *a* from the selection and demands timed dispatch pattern at the lower terminal, its starting from that terminal now being assured by closed TLX1*a* contacts as previously described.

Open XSGR1 contacts in the UDB coil circuit prevent registered up landing calls from effecting operation of that switch which, through SI, now controls lobby dispatch of only cars *b* and *c* neither of which at this time responds to up landing calls. Also to prevent the position of car *a* from effecting an interruption of the PIU–PID chain of contacts governing UDB, open contacts SGR10*a*, FIG. 1 isolate the circuit of car *a* normally operative to activate PIU–PID switches.

Closed contacts SGR9*a* prepare a circuit for automatic stopping of car *a* on approaching the twelfth landing at which point mechanical contacts TLX3*a* close. The completion of this stop circuit can be seen to depend on an absence of car calls, CK3*a* contacts closed, for the down direction of travel, DN8*a* contacts closed, and upon the further condition that no up landing calls exist above, contacts HJU3*a* closed, for the upward direction of travel, contacts UP10*a* closed.

Although circuitry described includes provision for serving passengers registering car calls during downward travel of car *a* or while at the lower terminal it is visualized such traffic would be discouraged by use of normally closed SGR*a*, SGR*b* and SGR*c* contacts (not shown) in respective down hall lantern control circuits. During segregated service of any car then such contacts would be in their open relationship to prevent illumination of its down hall lanterns. The segregated car then would normally travel between the twelfth landing and the highest car call resultant from pick-up of up landing call passengers. Reversal to down direction at such high car call would be followed by a non-stop run to twelve at which point stopping and reversal to up travel would occur. In its descent registered down landing calls would be by-passed. In the meantime cars other than the one chosen for service limited to up landing calls would continue to be selected and dispatched from the lower terminal with registered up landing calls being excluded in initiation of their dispatch. In their upward travel they would not stop in response to registered up landing calls and their reversal to downward travel would be governed by a highest car or down landing call, independent of higher registered up landing calls.

When up landing call demand subsides to some value less than five registered calls, say to two such calls, switch YSGR would be released followed by switches XSGR*a*, XSGR*b*, XSGR*c* and SGR*a*, for the assumption of closed KS1*a* made earlier. In this connection it is apparent that closing of either KS1*b* or KS1*c* instead of KS1*a* would have resulted in segregated response of car *b* or car *c*, respectively to up landing calls in a similar manner to that outlined for car *a*, similar individual car control circuitry being provided for cars *b* and *c* but not shown, for reasons of simplification.

It is also understood that reversal to upward travel of the designated segregated car can be arranged to occur at the lowest registered up landing call rather than at a fixed point of travel such as the twelfth landing. Such an alternate would be accomplished by adding lowest call reversal circuitry like an inversion of HJU–XH circuitry herein. Such an alternate would be particularly adaptable to installations without the express zone of travel chosen for this disclosure.

To summarize, it may be seen that the invention disclosed herein recognizes and detects registered demands for service segregated as to type or class, i.e., car call, up landing call and down landing call, and controls response of cars in a bank serving those demands in accordance with the type or class of demand registered. It further modifies such response in accordance with the volume of registered demand in a particular category.

As it is evident that other embodiments and circuit arrangements can be made without departing from the scope of this invention it is intended that drawings and description of the preferred embodiment herein be interpreted as illustrative and not in a limiting sense.

What is claimed is:

1. In an elevator dispatching and control system for a plurality of elevator cars serving a plurality of landings from a dispatching landing and having first means for registering demands for service at said plurality of landings, and second means for registering demands for service at said dispatching landing, and dispatching means controlled by the registration of a demand for service by said first means in the absence of a car at said dispatching landing and to which a car approaching said dispatching landing is to respond after arrival at said dispatching landing for dispatching said car from said dispatching landing at the end of a first predetermined time interval commencing with registration of said demand, said dispatching means also being controlled by the registration of a demand for service by said second means in the absence of a car at said dispatching landing and to which a car approaching said dispatching landing is to respond after arrival at said dispatching landing and in the absence of the registration of a demand by said first means for service by said last-mentioned car for dispatching said car from said dispatching landing at the end of a second predetermined time interval, longer than said first interval, commencing with the registration of said demand by said second means.

2. In an elevator dispatching and control system for a plurality of elevator cars serving a plurality of landings from a dispatching landing and having means for registering first calls at landings other than said dispatching landing for service toward and away from said dispatching landing, means for registering second calls at said dispatching landing for service away from said dispatching landing and means for registering third calls in said cars for service toward and away from said dispatching landing, means for selecting and dispatching cars from said dispatching landing comprising means responsive to one of said second calls for initiating a first dispatching interval at the end of which a car at said dispatching landing is dispatched therefrom, means for interrupting said interval when said interval has been running with no car at said dispatching landing and a car arrives at said dispatching landing and one of said third calls is not registered in said last-mentioned car within a predetermined time after the arrival of said last-mentioned car at said dispatching landing, means responsive to one of said third calls in a car at said dispatching landing for initiating a second dispatching interval substantially equal to said first interval at the end of which said last-mentioned car at said dispatching landing is dispatched therefrom, means responsive to said first calls for service away from said dispatching landing behind the next previously dispatched car for initiating a third dispatching interval shorter than said first and second intervals at the end of which a car at said dispatching landing is dispatched therefrom, means responsive to the registration of a combination of one of said second and third calls for service away from said dispatching landing with one of said first calls for service away from said dispatching landing and behind the next previously dispatched car for initiating a fourth dispatching interval shorter than said third dispatching interval at the end of which a car at said dispatching landing is dispatched therefrom.

3. In an elevator dispatching and control system for a plurality of elevator cars serving a plurality of upper landings spaced by a plurality of intermediate landings from a lower landing and having means for registering at said upper landings first and second calls for service respectively toward and away from said lower landing, means for registering at said lower landing third calls for service away from said lower landing and means for registering in said cars fourth and fifth calls for service respectively toward and away from said lower landing, means for selecting and dispatching cars from said lower landing comprising means responsive to one of said second and third calls behind the next previously dispatched car for initiating, in the presence and absence of a car at said lower landing, respectively first and second dispatching intervals at the end of which a car at said lower landing is dispatched therefrom, said first interval being shorter than said second interval, and means responsive to the registration of a combination of one of said third and fifth calls with one of said second calls behind the next previously dispatched car for initiating a third dispatching interval, shorter than said first dispatching interval, at the end of which a car at said lower landing is dispatched therefrom; and means responsive to registration of said second calls in excess of a predetermined plurality thereof for restricting the response of one of said cars to said second calls and fourth and fifth calls therein and for restricting the response of the remainder of said cars to said first, third, fourth and fifth calls whereby said one car answers only its car calls and calls at landings other than said dispatching landing for service away from said dispatching landing and the remainder of said cars answer only their car calls, dispatching landing calls and calls for service toward said dispatching landings.

4. In an elevator dispatching and control system for a plurality of elevator cars serving a plurality of landings from a dispatching landing, first means for registering first demands for service at said plurality of landings, second means for registering second demands for service in said cars and means controlled by said first and second means for dispatching a car from said dispatching landing at the end of a first predetermined interval of time commencing with the registration of one of said first demands for service and if there is no registered first demand for service by said car, for dispatching said car from said dispatching landing at the end of a second and different predetermined interval of time commencing with the registration of one of said second demands for service.

5. In an elevator dispatching and control system for a plurality of elevator cars serving a plurality of landings from a dispatching landing, first means at said plurality of landings for registering first demands for service away from said dispatching landing, second means in said cars for registering second demands for service away from said dispatching landing, means for dispatching cars from said dispatching landing, and means responsive to registration of said second demands in a previously dispatched car in excess of a predetermined plurality thereof for controlling said dispatching means by said first demands ahead of said last-mentioned car whereby the dispatching of a car available for dispatching from the dispatching landing is also controlled by landing demands ahead of a previously dispatched car only when the car demands registered in said previously dispatched car are in excess of a predetermined plurality thereof.

6. In an elevator dispatching and control system for a plurality of elevator cars serving a plurality of landings from a dispatching landing, first and second means at said plurality of landings for registering respectively first demands for service away from said dispatching landing and second demands for service toward said dispatching landing, third and fourth means in said cars for registering respectively third demands for service away from said dispatching landing and fourth demands for service toward said dispatching landing, fifth means at said dispatching landing for registering fifth demands for service away from said dispatching landing, means for dispatching cars from said dispatching landing and responsive to registration of one of said first, third and fifth demands behind a previously dispatched car for dispatching a next car at the end of a predetermined interval commencing with the registration of one of said demands, and means responsive to registration of said third demands in the next previously dispatched car in excess of a predetermined plurality thereof for controlling said dispatching means and for thereby causing said dispatching means to be responsive also to said first demands ahead of said last-mentioned car whereby the dispatching of a car available for dispatching from the dispatching landing is also controlled by landing demands for service away from the dispatching landing which are ahead of the next previously dispatched car only when the car demands registered in said next previously dispatched car are in excess of a predetermined plurality thereof.

7. In an elevator dispatching and control system for a plurality of elevator cars serving a plurality of landings from a dispatching landing, first means for registering first demands at said plurality of landings for service in the direction of said dispatching landing, second means for registering second demands for service including demands for service in said cars and demands at said plurality of landings for service away from said dispatching landing and means controlled by said first and second means for dispatching a car from said dispatching landing at the end of a first predetermined interval of time commencing with the registraiton of one of said first demands for service and if there is no registered first demand for service by said car for dispatching said car from said dispatching landing at the end of a longer predetermined interval of time commencing with the registration of one of said second demands for service.

8. A system as set forth in claim 1 further comprising third means for registering demands for service in said cars, and means for interrupting said second interval when said second interval has been running with no car at said dispatching landing and said first-mentioned car then arrives at said dispatching landing during said second interval and a demand for service is not registered in said last-mentioned car by said third means within a predetermined time after the arrival of said last-mentioned car at said dispatching landing.

9. A system as set forth in claim 8 further comprising means responsive to combined registration of demands by one of said second and third means and said first means for reducing the length of said first and second intervals.

10. A system as set forth in claim 9 wherein said means controlled by the registration of a demand for service by said first means in the absence of a car at said dispatching landing is also controlled by the registration of a demand for service by said first means with a car present at said dispatching landing for dispatching a said car from said dispatching landing at the end of said first predetermined time interval commencing with registration of said demand and said means controlled by the registration of a demand for service by said second means in the absence of a car at said dispatching landing car is also controlled by the registration of demands for service by said second means and said third means with a car present at said dispatching landing for dispatching a said car from said dispatching landing at the end of said second predetermined time interval.

11. A system as set forth in claim 2 further comprising means responsive to said third calls for service away from said dispatching landing in the next previously dispatched car in excess of a predetermined plurality thereof for controlling said means responsive to said first calls and for thereby causing said last-mentioned means to be responsive also to said first calls for service away from said dispatching landing and ahead of said last-mentioned car.

12. A system as set forth in claim 2 further comprising means responsive to registration of said first calls for service away from said dispatching landing in excess of a predetermined plurality thereof for restricting the response of one of said cars to said first calls for service away from said dispatching landing and to said third calls therein and for restricting the response of the remainder of said cars to said first calls for service toward said dispatching landing, to said second calls, and to said third calls therein for service toward and away from said dispatching landing, whereby said one car answers only its car calls and calls at landings other than said dispatching landing for service away from said dispatching landing and the remainder of said cars answer only their car calls, dispatching landing calls and calls for service toward said dispatching landings.

13. A system as set forth in claim 12 further comprising means for reversing a car at the landing corresponding to the registered call of said first calls and third calls therein most remote from said dispatching landing in the absence of another car travelling toward said dispatching landing and adjacent any of a plurality of adjacent landings most remote from said dispatching landing.

14. A system as set forth in claim 3 further comprising means responsive to said fifth calls in the next previously dispatched car in excess of a predetermined plurality thereof for controlling said means responsive to said second calls and for thereby causing said last-mentioned means to be responsive also to said second calls ahead of said last-mentioned car, and means for reversing a car at the landing corresponding to the registered call of said first, second and fifth calls most remote from said lower landing in the absence of another car travelling toward said lower landing and adjacent any one of a plurality of said upper landings.

15. A system as set forth in claim 4 further comprising third means for registering third demands for service at said dispatching landing, and wherein said means controlled by said first and second means for registering demands is also controlled by said third means for dispatching a car from said dispatching landing at the end of a first predetermined interval of time commencing with the registration of one of said first demands for service and for dispatching a car from said dispatching landing at the end of said second interval of time commencing with the registration of one of said second and third demands for service.

16. A system as set forth in claim 15 wherein said second interval is longer than said first interval and wherein said dispatching means also dispatches a car from said dispatching landing at the end of a third predetermined interval of time shorter than said first interval commencing with the registration of one of said demands and the registration of another of said demands within a time interval after the registration of said one demand which is shorter than said first interval.

17. In an elevator dispatching and control system for a plurality of elevator cars serving a plurality of landings from a dispatching landing, first and second means at said plurality of landings for registering first and second demands for service respectively away from and toward said dispatching landing, third and fourth means in said cars for registering third and fourth demands for service respectively away from and toward said dispatching landing, fifth means at said dispatching landing for registering fifth demands for service away from said dispatching landing, means for dispatching cars from said dispatching landing in response to the registration of one of said demands, and segregated response means responsive to the registration of a plurality of one of said demands in excess of a predetermined plurality thereof for restricting the response of at least one of said cars to said one demand and another of said demands and for restricting the response of at least one other of said cars to demands other than said one demands.

18. A system as set forth in claim 17 wherein said segregated response means is responsive to the registration of said first demands in excess of a predetermined plurality thereof for restricting the response of one of said cars to said first demands and said third and fourth demands therein and for restricting the response of the remainder of said cars to said second and fifth demands and said third and fourth demands therein.

19. A system as set forth in claim 18 wherein said means for dispatching cars dispatches cars from said dispatching landing at the end of predetermined intervals commencing with the registration of one of said demands.

20. In an elevator dispatching and control system for a plurality of elevator cars serving a plurality of landings from a dispatching landing and having first means for registering demands for service at said plurality of landings, means controlled by the registration of a demand for service by said first means in the absence of a car at said dispatching landing and to which a car approaching said dispatching landing is to respond after arrival at said dispatching landing and also controlled by the registration of a demand for service by said first means with a car present at said dispatching landing for dispatching a said car from said dispatching landing at the end of a first predetermined time interval commencing with registration of said demand, second means for registering demands for service in said cars, and means responsive to combined registration of demands by said first and second means for reducing the length of said interval.

References Cited by the Examiner
UNITED STATES PATENTS

| | | | |
|---|---|---|---|
| 2,740,495 | 4/1956 | Santini et al. | 187—29 |
| 2,840,189 | 6/1958 | Santini et al. | 187—29 |
| 2,847,090 | 8/1958 | Bailey | 187—29 |
| 2,924,298 | 2/1960 | Macredis | 187—29 |
| 3,009,543 | 11/1961 | Burgy | 187—29 |
| 3,073,417 | 1/1963 | Lusti | 187—29 |

ORIS L. RADER, *Primary Examiner.*

T. LYNCH, *Assistant Examiner.*